April 2, 1963    R. T. PIPER    3,083,466
SCALE MOUNTING DEVICE
Filed Oct. 25, 1960    2 Sheets-Sheet 1

Robert T. Piper
INVENTOR.

April 2, 1963 R. T. PIPER 3,083,466
SCALE MOUNTING DEVICE
Filed Oct. 25, 1960 2 Sheets-Sheet 2
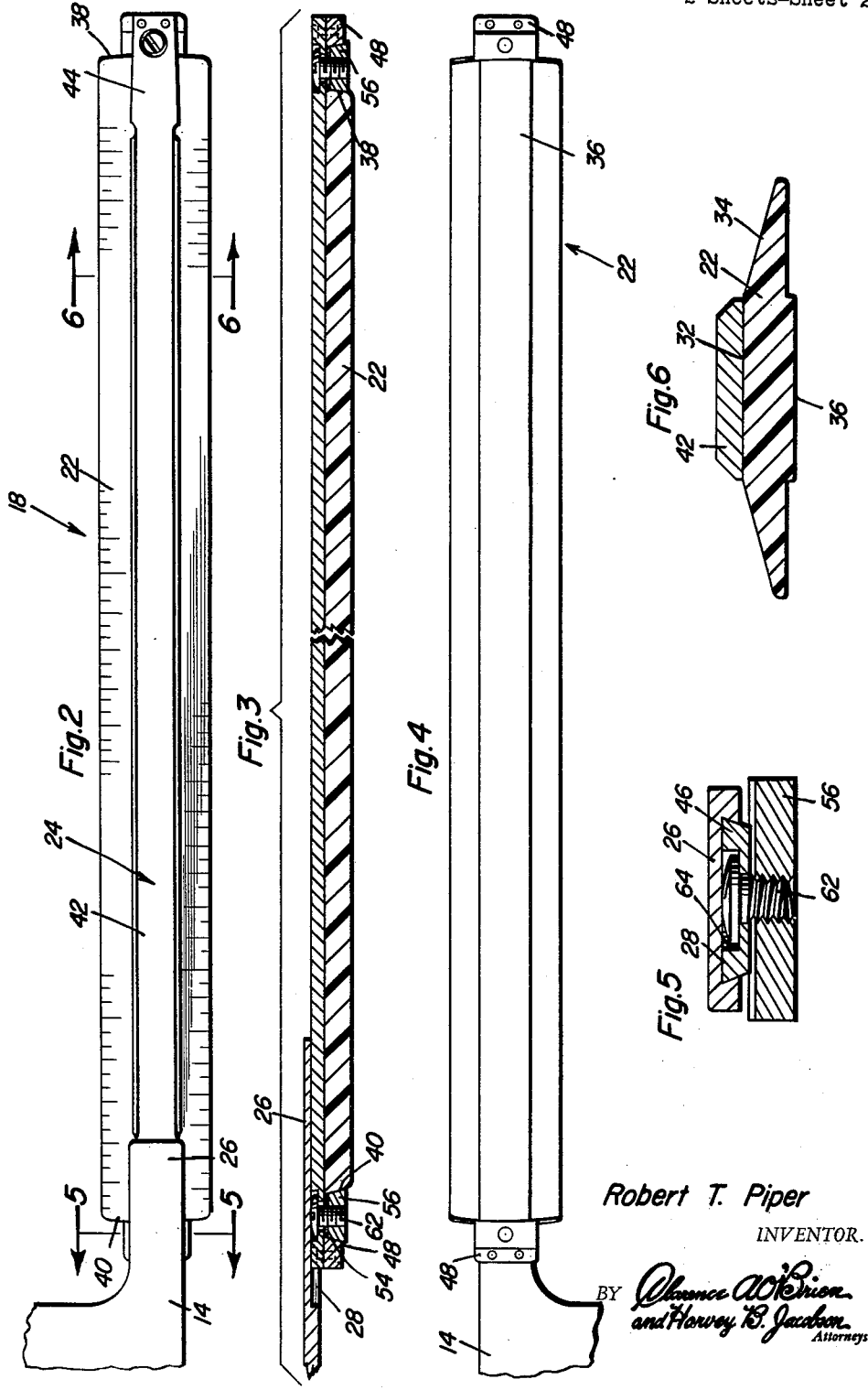
Robert T. Piper
INVENTOR.

3,083,466
SCALE MOUNTING DEVICE
Robert T. Piper, 1784 Walnut St., Eugene, Oreg.
Filed Oct. 25, 1960, Ser. No. 64,827
14 Claims. (Cl. 33—79)

This invention relates to drafting machines or instruments which removably mount elongated scales which must be maintained in accurate aligned positions.

The clear plastic scales commonly used in conjunction with drafting machines are often removably mounted thereon so that the scales may be replaced when they have become worn. The scales used with a drafting machine have two main purposes. First for measuring lengths of lines and second as a straight edge along which lines are drawn. Scales commonly have one or more graduations along each straight edge and each scale has two straight edges. A scale may be graduated 1/4"=1'-0" along one straight edge and 1/8"=1'-0" along the other straight edge. Scales are easily removed from and assembled on drafting machines. Each manufacturer of drafting machines has their particular scale unlocking and locking method. Thus the graduation of a scale a draftsman chooses may quickly and easily be placed in position for use. Scales now in use built especially for drafting machines are subject to a bending moment each time a force is applied to the scale or the drafting machine. Clear plastic scales frequently fracture because of this bending moment and also because of holes and metal inserts at points where the bending moment in the scale is severe.

The intent of this scale mounting device is to eliminate the possibility of bending moments occurring in the scale and still maintain quick and easy mounting, demounting and changing of the scale. The elimination of the holes and metal inserts in the plastic scale is a result of the method used in securing the scale to the scale holder.

This invention therefore features an arrangement for holding or mounting of the plastic scales or for that matter scales of any suitable material, on a drafting machine in such a manner that the scales may not only be accurately positioned but also so mounted that forces applied to the drafting machine will not be transferred to the plastic scales through the mounting connections between the machine and the scales as is characteristic of scale mountings in previous drafting machines. Accordingly, the scales may be designed for use pursuant to this invention without the drilling of weakening and distorting holes therein, said scales also have a longer useful life inasmuch as little if any stresses are applied thereto from the drafting machine. It is therefore an important object of this invention to provide a scale holder especially adapted for application to a drafting machine by means of which the scale itself may be accurately positioned within the scale holder and yet have no fasteners extending therethrough in order to secure the scales to the scale holder.

Another object of this invention is to provide a scale holder device for clear plastic scales employing wedging members at the ends thereof for adjustably securing a scale to the holder.

An additional object of this invention is to provide a scale holder featuring wedging members for holding the scale to the holder and also including arcuate wedging surfaces which cooperate with arcuate surfaces at the ends of the scale permitting angular adjustment of the scale relative to the holder prior to locking the scale to the holder by the wedges.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of one scale and scale holder device in assembled relation.

FIGURE 3 is a side sectional view of the scale and scale holder device illustrated in FIGURE 2.

FIGURE 4 is a bottom plan view of the scale and scale holder device illustrated in FIGURE 2.

FIGURE 5 is a transverse sectional view taken through a plane indicated by section line 5—5 in FIGURE 2.

FIGURE 6 is a transverse sectional view taken through a plane indicated by section line 6—6 of FIGURE 2.

Figure 1:
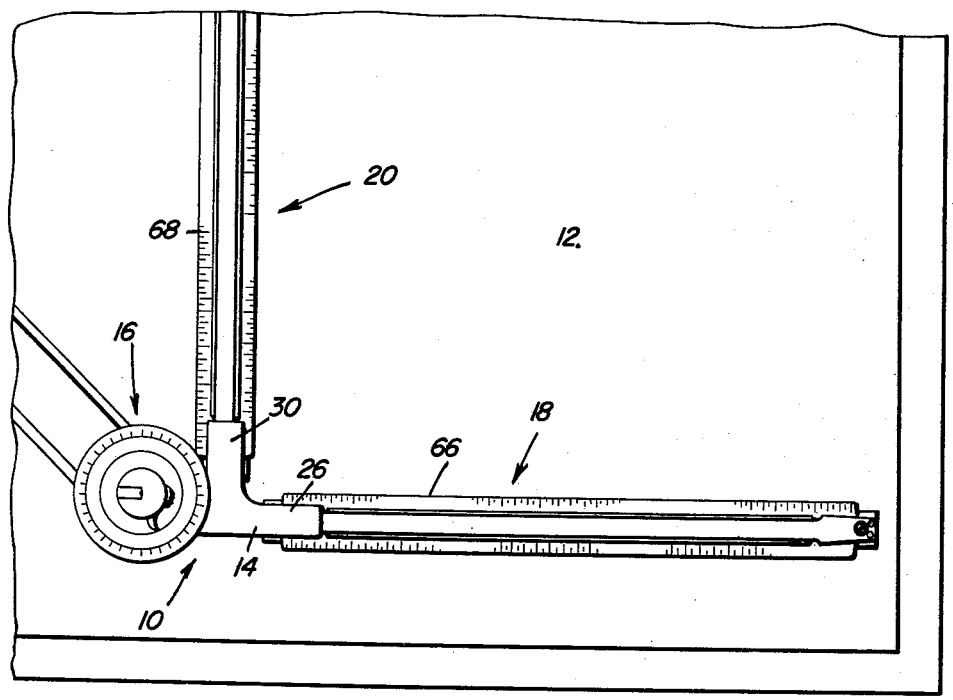
FIGURE 1 is a top plan view of a portion of a drafting machine utilizing the novel scale and scale holder device of this invention.

Referring now to the drawings in detail, FIGURE 1 illustrates a typical drafting machine generally designated by reference numeral 10 which is mounted on a drafting board 12. The drafting machine includes a scale mounting member 14 which is angularly adjustable by means of the protractor device 16 of the drafting machine 10, the mounting member 14 having assembled thereon in perpendicular relation to each other a pair of scale devices generally indicated by reference numerals 18 and 20. Each of the scale devices 18 and 20 is composed of the novel scales and scale holder of this invention.

Referring therefore to FIGURE 2 in particular, it will be observed that the scale device 18 for example includes a clear plastic scale generally indicated by reference numeral 22 which is mounted or assembled to a scale holder device generally indicated by reference numeral 24. It will also be observed that the scale holder device 24 is inserted at one end into the mounting member 14. Referring therefore to FIGURES 3 and 5 in particular, it will be observed that the drafting machine mounting member 14 includes a mounting arm 26, the bottom surface of which has a dovetailed groove 28 for slidably receiving one end of the holder device 24 of the scale device 18. The other mounting arm 30 of the mounting member 14 similarly receives one end of the other scale device 20 as shown in FIGURE 1. It will therefore be appreciated that the scale devices 18 and 20 may be removed from the mounting member 14 for replacement of the scales thereof and reassembled on to the mounting member. Accordingly, the mounting of the scales on their respective holder devices will also require means for accurately positioning the scales on the scale devices 18 and 20 with respect to each other in order to obtain the exact perpendicular relationship therebetween.

Referring now to FIGURES 2, 3, 4, 6 and 7, it will be observed that the scale 22 has a top flat surface 32 and side tapering surfaces 34. Also a bottom surface 36 is provided for resting on the drafting board paper or surface. The scale 22, however, also features certain novel and utilitarian aspects. It will therefore be observed that the end surfaces 38 and 40 of the scale 22 are arcuate, the curvature of said end surfaces being centered at the mid-point of the scale 22. The curvatures 38 and 40 therefore have a radius equal to one-half the length of the scale 22. It will also be observed from FIGURE 3 in particular, that the end surfaces 38 and 40 are inclined downwardly from a perpendicular for wedging purposes as will hereinafter be explained. It will also be observed that the scale 22 contains no holes or other departures from the generally uniform cross-section of the scale that would otherwise be the case in order to mount the scale to a holder device. The end curvatures of the surfaces 38 and 40 and the wedge inclination thereof as hereinabove indicated constitute the novel departures from other types of scales by means of which the scale 22 of this invention may be mounted on the novel holder device 24 without having any stresses applied thereto and without necessitating any cross-sectional weakening holes to be drilled through the scales. Also, manufacture of the novel scales 22 for this invention is rendered more economical.

Figure 7:
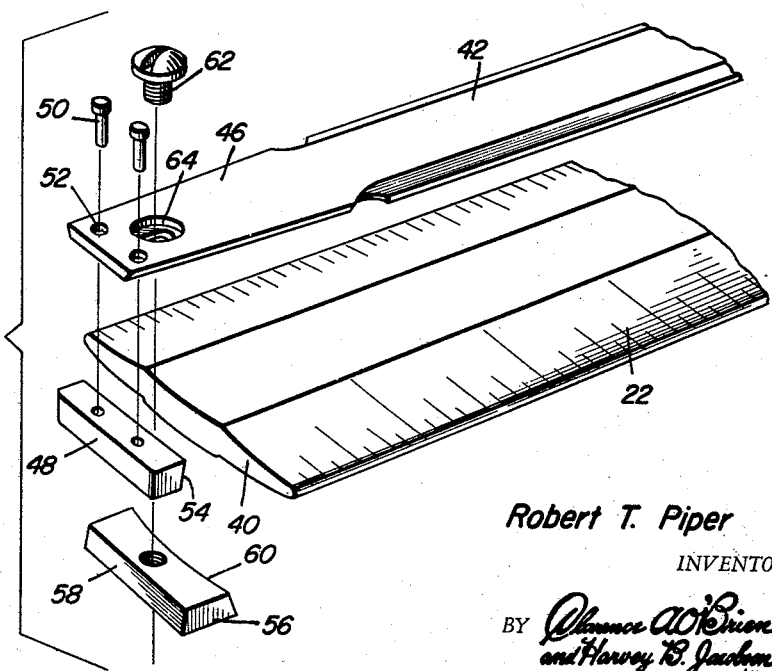
FIGURE 7 is a disassembled perspective view of one end of a scale and scale holder device.

It will therefore be observed that the holder device 24 which cooperates with the novel scale 22 includes an elongated holder member 42 which rests upon the top flat surface 32 of the scale 22 as more clearly seen in FIGURE 6. It will also be observed that each end of the member 42 has a tapered portion 44 and 46. The tapered portion 44 or 46 may therefore be inserted into the dovetail slot 28 of the drafting machine holder member 14. The holder member 42 may therefore be mounted within the holder member 14, however, the scale 22 must be longitudinally and angularly adjusted with respect to the holder 24 and the mounting member 14 so that the two scale devices 18 and 20 will be perpendicular to each other and properly spaced from the pivot point of the drafting machine. It will therefore be observed that at each end of the member 42, an end piece 48 is mounted. Referring therefore to FIGURES 3 and 7 in particular it will be observed that the end pieces are secured to the tapered end portions 44 and 46 of the member 42 by means of a pair of rivets 50 which extend through the end pieces 48 and between recesses 52 adjacent the ends of the tapered end portions 44 and 46 and recesses in the end pieces 48 to make flush surfaces on the end pieces and the end portions. It will also be observed that the inwardly facing surface 54 on each of the end pieces 48 is inclined downwardly at an angle diverging from the inclination of the confronting surface 40 or 38 on the ends of the scale 22.

It will therefore be apparent that in order to lock the scale 22 to the holder device 24, a pair of wedge elements 56 are disposed between the wedging surfaces 54 and 38 or 40 at the ends of the scale 22. Referring therefore to FIGURE 7 in particular it will be observed that the wedge element 56 includes a wedge surface 58 which is in abutting relation to the wedge surfaces 54 on the end piece 48. The wedge element 56 also includes an opposite wedge surface 60 which is disposed in abutting relation to the wedge surface 40 for example at one end of the scale 22. It will be observed however that the wedge surface 60 of the wedge element 56 also has a curvature equal to that of the curvature of the end surface 40 of the scale 22 for example. As a result thereof, in addition to wedging engagement in longitudinal spaced relationship between the wedge elements 56 and the ends of the scale 22, angular adjustment may be effected between the scale 22 and the wedge element 56 prior to wedge locking thereof. In order to lock the wedge elements 56 between the end pieces 48 on the holder member 42 and the ends of the scale 22, the wedge elements 56 must be drawn upwardly into wedging engagement between the end surfaces of the scale and the wedging surfaces of the end pieces. Accordingly, a screw fastener element 62 is provided which is seated within a countersunk recess 64 adjacent the ends of the member 42. The head of screw fastener 62 must be loose fit in the countersunk recess 64 in scale holder 42. Holes in ends of scale holder 42 must be elongated to allow movement of 62 and 56 longitudinally along the center line of scale holder 42. This is to allow for slight manufacturing inaccuracies. For instance, in the length of scales. It will therefore be apparent that the scale 22 may be loosened for angular adjustment relative to the holder device upon loosening of the screw fastener 62 to axially move the wedge element 56 downwardly with respect to the holder member 42. After the scale 22 has been angularly adjusted relative to the member 42 rotation of the screw fastener 62 may be effected to draw the wedge element 56 upwardly into wedging condition.

From the foregoing description, the advantages and conveniences of the novel scale and scale holder device of this invention will be apparent. When mounting new scales 22 on each of the scale devices 18 and 20, the scale 22 will be aligned with the holder member 42 as accurately as possible and the wedge elements 56 tightened. The scale devices 18 and 20 will be inserted within the arms 26 and 30 of the mounting member 14. A line will then be drawn along one edge 66 of scale device 18 for example. The drafting machine 10 will then be rotated 90° clockwise so as to bring the edge 68 of scale device 20 over the line previously drawn. If the edge 68 of the scale device 20 is not aligned with the line previously drawn, the wedge element 56 at the end of the scale device 20 which is not inserted within the mounting member 14 may be loosened and the scale 22 of the scale device 20 angularly adjusted with respect to the scale holder device so as to bring the scale edge 68 into alignment with the line previously drawn. The loosened wedge element 56 may then be retightened to thereby place the scale device 20 in exact perpendicular relationship to the scale device 18.

From the foregoing description, it will be apparent that the scale mounting device has a scale holder that is symmetrical about the center of its length when the scale holder is flat on a table and rotated in a horizontal plane, but not symmetrical top to bottom. The same is true of the scale. This makes it possible to reverse the scale holder scale assembly on the drafting machine. It is also possible to release the wedge with the screw fastener and rotate the scale for angular adjustment, removal of scale from scale holder, or replacing a scale on a scale holder while the scale holder is mounted on the drafting machine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a drafting machine, the combination of elongated scale means and a scale mounting device comprising, scale holder means disposed on top of the scale means and extending beyond opposite ends of the scale means in spaced relation thereto, and wedge means engageable with said holder means and scale means at each end of the scale means for retaining the scale means assembled on the scale holder means in angularly and longitudinally adjusted position.

2. In a drafting machine, the combination of elongated scale means and a scale mounting device comprising, scale holder means disposed on top of the scale means and extending beyond opposite ends of the scale means in spaced relation thereto, and wedge means engageable with said holder means and scale means at each end of the scale means for retaining the scale means assembled on the scale holder means, wedge means including edges abutting against each end of the scale means, each edge and scale end having parallel arcuate curvatures enabling angular adjustment of the scale means relative to the scale holder means.

3. The combination of claim 2, wherein the arcuate curvatures have a radius equal to half the length of the scale means.

4. The combination of claim 3, including fastener means mounted in the holder means adjacent opposite ends thereof for engagement with the wedge means to draw the wedge means into locking engagement between the holder means and scale means at opposite ends thereof.

5. The combination of claim 4 wherein the opposite endns of the scale holder means are tapered for insertion of one end of the assembled holder means and scale means into the drafting machine.

6. The combination of claim 5, wherein said fastener means is mounted within recesses formed at opposite ends of the holder means.

7. The combination of claim 6 wherein said scale holder means includes end portions, said end portions having wedge surfaces in confronting spaced relation to the ends of the scale means for cooperation with said wedge means for locking the scale means between the end portions.

8. The combination of claim 1 wherein said scale holder means includes end portions, said end portions having vertically tapering wedge surfaces in confronting spaced relation to the ends of the scale means for cooperation with said wedge means for locking the scale means between the end portions.

9. The combination of claim 8, including fastener means mounted in the holder means adjacent opposite ends thereof for engagement with the wedge means to draw the wedge means into locking engagement between the holder means and scale means at opposite ends thereof.

10. The combination of claim 9, wherein said fastener means is mounted within recesses formed at opposite ends of the holder means.

11. The combination of claim 10, wherein the opposite ends of the scale holder means are tapered for insertion of one end of the assembled holder means and scale means into the drafting machine.

12. In a drafting machine, the combination of a holder device comprising an elongated member having tapered end portions, end pieces removably secured to said member at the end portions including inwardly facing wedge surfaces, and a clear plastic scale disposed below the elongated member including parallel sides projecting laterally beyond the elongated member and having ends in confronting spaced relation to the wedge surfaces on the end pieces, wedges insertable between said wedge surfaces and scale ends and screw fasteners disposed within recesses formed in the tapered end portions of the elongated member for engagement with the wedges to lock the scale in the holder device by wedging thereof between the end pieces at opposite ends of the elongated member, said scale ends and wedges having abutting surfaces with a curvature centered at a mid-point on the scale to enable angular adjustment of the scale with respect to the elongated member before locking by the wedges.

13. In a drafting machine, the combination of elongated scale means and a scale mounting device comprising, scale holder means disposed on top of the scale means and extending beyond opposite ends of the scale means in spaced relation thereto, and wedge means engageable with said holder means and scale means at each end of the scale means for retaining the scale means assembled on the holder means, said scale means being angularly adjustable relative to the scale holder means.

14. In a drafting machine, the combination of scale means and a scale mounting device comprising, scale holder means removably mounted on the scale mounting device and extending longitudinally beyond opposite ends of the scale means and wedge means mounted by the holder means for engagement with the scale means at said opposite ends thereof for angularly adjusted positioning of the scale means on the holder means, said wedge means including vertically tapering edges abutting mating surfaces at each end of the scale means, said edges and surfaces being arcuate to enable angular adjustment of the scale means relative to the holder means.

References Cited in the file of this patent

UNITED STATES PATENTS

| 2,029,899 | Stahl | Feb. 4, 1936 |
| 2,182,028 | Little | Dec. 5, 1939 |

FOREIGN PATENTS

| 3,801 | Great Britain | 1904 |